US012692168B2

(12) United States Patent
Lee et al.

(10) Patent No.: US 12,692,168 B2
(45) Date of Patent: Jul. 28, 2026

(54) SILICA SOL, SILICA AEROGEL BLANKET MANUFACTURED USING SAME, AND METHOD FOR MANUFACTURING SAME

(71) Applicant: LG CHEM, LTD., Seoul (KR)

(72) Inventors: Kyu Reon Lee, Daejeon (KR); Se Won Baek, Daejeon (KR); Hyun Woo Jeon, Daejeon (KR); Mi Ri Kim, Daejeon (KR); Sung Min Yu, Daejeon (KR); Sang Woo Park, Daejeon (KR); Bong June Kim, Daejeon (KR)

(73) Assignee: LG CHEM, LTD, Seoul (KR)

( * ) Notice: Subject to any disclaimer, the term of this patent is extended or adjusted under 35 U.S.C. 154(b) by 0 days.

(21) Appl. No.: 18/431,792

(22) Filed: Feb. 2, 2024

(65) Prior Publication Data

US 2024/0228304 A1     Jul. 11, 2024

Related U.S. Application Data

(63) Continuation of application No. 17/425,457, filed as application No. PCT/KR2020/013269 on Sep. 28, 2020, now abandoned.

(30) Foreign Application Priority Data

Sep. 30, 2019     (KR) ........................ 10-2019-0121123

(51) Int. Cl.
| | |
|---|---|
| *C01B 33/159* | (2006.01) |
| *C01B 33/145* | (2006.01) |
| *C01B 33/158* | (2006.01) |
| *F16L 59/02* | (2006.01) |

(52) U.S. Cl.
CPC .......... *C01B 33/159* (2013.01); *C01B 33/145* (2013.01); *C01B 33/1585* (2013.01); *F16L 59/026* (2013.01); *F16L 59/028* (2013.01); *C01P 2004/03* (2013.01); *C01P 2004/61* (2013.01); *C01P 2006/32* (2013.01)

(58) Field of Classification Search
CPC . C01B 33/159; C01B 33/145; C01B 33/1585; C01B 33/155; F16L 59/026; F16L 59/028; C01P 2004/03; C01P 2004/61; C01P 2006/32; Y02E 60/13; B01J 23/04; B01J 27/24; B01J 31/0239; C04B 30/02
See application file for complete search history.

(56) References Cited

U.S. PATENT DOCUMENTS

| | | | | |
|---|---|---|---|---|
| 5,830,387 A | * | 11/1998 | Yokogawa | .......... C01B 33/1585 428/404 |
| 2001/0034375 A1 | | 10/2001 | Schwertfeger et al. | |
| 2011/0240907 A1 | * | 10/2011 | Sharma | ............... C01B 33/1585 252/62 |
| 2014/0273701 A1 | | 9/2014 | Samanta et al. | |

| | | | |
|---|---|---|---|
| 2016/0096949 A1 | 4/2016 | Evans et al. | |
| 2018/0010726 A1 | 1/2018 | Kim et al. | |
| 2018/0029892 A1 | 2/2018 | Yu et al. | |
| 2018/0094114 A1 | 4/2018 | Evans et al. | |
| 2018/0112057 A1 | 4/2018 | Evans et al. | |
| 2018/0112058 A1 | 4/2018 | Evans et al. | |
| 2018/0134867 A1 | 5/2018 | Evans et al. | |
| 2018/0148888 A1 | 5/2018 | Kim et al. | |
| 2018/0312407 A1 | 11/2018 | Oh et al. | |
| 2019/0002356 A1 | 1/2019 | Hebalkar | |
| 2019/0010060 A1 | 1/2019 | Oh et al. | |
| 2019/0062167 A1 | 2/2019 | Kim et al. | |
| 2019/0119494 A1 | 4/2019 | Makino et al. | |
| 2019/0203014 A1 | 7/2019 | Evans et al. | |
| 2020/0048100 A1 | 2/2020 | Yu et al. | |
| 2020/0216322 A1 | * 7/2020 | Min | ...................... C01B 33/152 |
| 2020/0255295 A1 | 8/2020 | Kim et al. | |
| 2022/0081532 A1 | 3/2022 | Evans et al. | |
| 2022/0289939 A1 | 9/2022 | Evans et al. | |
| 2023/0134383 A1 | 5/2023 | Evans et al. | |
| 2024/0026121 A1 | 1/2024 | Evans et al. | |

FOREIGN PATENT DOCUMENTS

| | | | |
|---|---|---|---|
| CN | 101948297 A | 1/2011 | |
| CN | 107513863 A | 12/2017 | |
| CN | 108290744 A | 7/2018 | |
| EP | 3257812 A1 | 12/2017 | |
| EP | 3284720 A1 | 2/2018 | |
| EP | 3351293 A1 | 7/2018 | |

(Continued)

OTHER PUBLICATIONS

Sinko (Influence of Chemical Conditions on the Nanoporous Structure of Silicate Aerogels, Materials, 2010) (Year: 2010).*

Jia Ma et al., "Preparation and Low-temperature Properties of Fiber Reinforced SiO2 Aerogel Composites", Material Reports B, 2015, vol. 29, No. 10, pp. 43-46.

Zhang Dezhong, "Application of SiO2 aerogel in the field of thermal insulation", Chemical Research, 2016, vol. 27, No. 1, pp. 120-127.

*Primary Examiner* — Anthony J Zimmer

*Assistant Examiner* — Logan Laclair

(74) *Attorney, Agent, or Firm* — Bryan Cave Leighton Paisner LLP

(57) ABSTRACT

A silica sol, a silica aerogel blanket using the same, and a method for manufacturing the same, wherein a hydrophobizing agent, a base catalyst, an organic solvent, and water are included in a catalyst composition when manufacturing the silica aerogel blanket, so that a wet aging step which is performed under high-temperature conditions and increases the amount of a solvent used, and a surface modification step which uses a large amount of an organic solvent and an expensive surface modifier, resulting in a process that is complex and long and thus inhibiting economic feasibility and productivity, can be omitted.

12 Claims, No Drawings

(56)     References Cited

FOREIGN PATENT DOCUMENTS

| | | | |
|---|---|---|---|
| JP | 2011127624 | A | 6/2011 |
| JP | 2012-144428 | | 8/2012 |
| JP | 2017190602 | A | 10/2017 |
| JP | 2017533163 | A | 11/2017 |
| JP | 2018-523022 | | 8/2018 |
| JP | 2019-513665 | | 5/2019 |
| KR | 10-1998-0012472 | | 4/1998 |
| KR | 10-2007-0114668 | | 12/2007 |
| KR | 10-1147494 | | 5/2012 |
| KR | 10-2012-0070948 | | 7/2012 |
| KR | 10-1498562 | | 3/2015 |
| KR | 20180029235 | A | 7/2016 |
| KR | 20180040373 | A | 10/2016 |
| KR | 2017-0031011 | A | 3/2017 |
| KR | 10-2017-0063800 | | 6/2017 |
| KR | 10-2018-0029235 | | 3/2018 |
| KR | 10-2018-0040373 | | 4/2018 |
| KR | 2018-0132723 | A | 12/2018 |
| KR | 10-2019-0008007 | | 1/2019 |
| KR | 10-1938655 | | 1/2019 |
| KR | 10-2019-0098728 | | 8/2019 |
| WO | 2016167494 | A1 | 10/2016 |
| WO | 2018-056626 | A1 | 3/2018 |

* cited by examiner

1

SILICA SOL, SILICA AEROGEL BLANKET MANUFACTURED USING SAME, AND METHOD FOR MANUFACTURING SAME

CROSS-REFERENCE TO RELATED APPLICATIONS

This application is a continuation application of co-pending U.S. patent application Ser. No. 17/425,457, filed Jul. 23, 2021, which is a National Stage Application of International Application No. PCT/KR2020/013269 filed on Sep. 28, 2020, which claims priority to and the benefit of Korean Patent Application No. 10-2019-0121123, filed on Sep. 30, 2019, in the Korean Intellectual Property Office, the disclosure of which is incorporated herein in its entirety by reference.

TECHNICAL FIELD

The present invention relates to a method for manufacturing a silica aerogel blanket, the method using a silica sol including a hydrophobizing agent and water in a catalyst composition, thereby manufacturing a silica aerogel blanket having excellent hydrophobicity, and capable of simplifying an aerogel blanket manufacturing process and increasing reuse efficiency of waste liquid generated after the manufacturing of an aerogel blanket.

BACKGROUND

An aerogel is a superporous, high specific surface area ($\geq 500$ m$^2$/g) material having a porosity of about 90-99.9% and a pore size in the range of 1-100 nm, and is a material having excellent properties of ultra-light weight, super thermal insulation, ultra-low dielectric, and the like. Accordingly, research on the development of aerogel materials as well as research on the practical use thereof as environmentally friendly high-temperature thermal insulation materials, ultra-low dielectric thin films highly-integrated devices, catalysts and catalyst carriers, electrodes for supercapacitors, and electrode materials for seawater desalination have been actively conducted.

The biggest advantages of the aerogel are that the aerogel has super-insulation properties exhibiting a thermal conductivity of 0.300 W/m. K or less, which is lower than that of a conventional organic thermal insulation material such as Styrofoam, and that fire vulnerability and the generation of harmful gases in case of occurrence of fire which are fatal weaknesses of the organic thermal insulation material can be solved.

In general, the aerogel is manufactured by preparing a hydrogel from a silica precursor such as water glass and an alkoxysilane group (TEOS, TMOS, MTMS, and the like) and removing a liquid component inside the hydrogel without destroying a microstructure.

Particularly, a hydrophobic silica aerogel blanket in which a hydrophobic silica aerogel is formed in a fiber is a functional thermal insulation material which prevents corrosion by moisture, and is widely used in construction or industrial fields. In general, such a hydrophobic silica aerogel blanket is manufactured through steps of silica sol solution preparation, gelation, aging, surface modification, and drying.

However, the surface modification step of the typical manufacturing method as described above uses a large amount of an organic solvent and an expensive surface modifier, and the process thereof is complex and long, so that economic feasibility and productivity are not good. In addition, ammonia generated when the surface of the silica aerogel is modified by the surface modifier reacts with carbon dioxide used in a supercritical drying step and forms ammonium carbonate salt, thereby causing problems such as blocking the piping of supercritical drying equipment, and the like, resulting in inhibiting the efficiency of a process. In addition, since there is a large amount of ammonia remaining in waste liquid generated after drying, it is impossible to recycle the waste liquid immediately, and there are problems in that a long purification process is required and purification cost increases in order to recycle the waste liquid.

In addition, as for an aging step which is a step for reinforcing the structure of an aerogel, since a structure reinforcing effect can be achieved when wet aging is performed in the presence of a base catalyst solution such as ammonia/ethanol, residual ammonia generated according to the performance of wet aging creates the same problem as a problem caused by surface modification when drying and reusing waste liquid, and there is a problem of cost increase due to additional use of a solvent.

In addition, since a wet aging step and a surface modification step are performed separately, the process is cumbersome.

Therefore, the present inventors have researched into ways of manufacturing a silica aerogel blanket having a robust structure and exhibiting hydrophobicity without a surface modification step and having to perform wet aging, and have developed a method for manufacturing a silica aerogel blanket, the method capable of solving problems of a typical wet aging step and a typical surface modification step.

PRIOR ART DOCUMENT

Patent Document (Patent Document 1) KR10-1147494B1

BRIEF DESCRIPTION

Technical Problem

An aspect of the present invention provides a silica sol and a method for manufacturing a silica aerogel blanket using the same, wherein a wet aging step which is performed under the presence of a base catalyst and an organic solvent, and thus, increases the amount of a solvent used, and a surface modification step which uses a large amount of an organic solvent and an expensive surface modifier, and the process of which is complex and long, thereby inhibiting economic feasibility and productivity can be omitted when manufacturing the silica aerogel blanket.

The present invention is to provide a silica sol and a method for manufacturing a silica aerogel blanket using the same, wherein a wet aging step performed at high temperatures and a surface modification step are omitted so that energy expenditure can be reduced, and due to the omission of the above steps, aging solution supply equipment and surface modifier supply equipment are not required so that simplified manufacturing facilities can be used.

Another aspect of the present invention provides a silica sol and a method for manufacturing a silica aerogel blanket using the same, wherein it is possible to significantly suppress the generation of an ammonium carbonate salt which is generated during supercritical drying by ammonia generated when the surface of the silica aerogel blanket is modified by ammonia and a surface modifier remaining after they are used during wet aging.

Yet another aspect of the present invention provides a method for manufacturing a silica aerogel blanket, the method capable of reducing the amount of ammonia in waste liquid remaining after drying so that the waste liquid can be efficiently reused, and reducing the loss of a solvent and a hydrophobizing agent by improving the reuse rate of the waste liquid.

Still another aspect of the present invention provides a method for manufacturing a silica aerogel blanket, the method capable of adjusting the amount of a base catalyst in a catalyst composition, thereby easily adjusting gelation time.

Still yet another aspect of the present invention provides a silica aerogel blanket having an excellent degree of hydrophobicity inside the silica aerogel blanket so that the cross-sectional water repellency of the blanket is excellent.

Technical Solution

According to an aspect of the present invention, there is provided a silica sol including a silica precursor composition and a catalyst composition, wherein the catalyst composition includes a hydrophobizing agent, a base catalyst, water, and an organic solvent, wherein the base catalyst is included in an amount of 0.4 parts by weight to 1.0 part by weight based on 100 parts by weight of the silica sol.

In addition, the present invention provides a silica sol in which water is included in a catalyst composition in an amount of 3 equivalents to 8 equivalents based on 1 equivalent of a hydrophobizing agent.

According to another aspect of the present invention, there is provided a method for manufacturing a silica aerogel blanket, the method including 1) preparing a silica sol, 2) impregnating the silica sol into a substrate for a blanket, and 3) leaving the silica sol-substrate for a blanket composite to stand for a period of time, wherein the silica sol is the above-described silica sol.

According to yet another aspect of the present invention, there is provided a silica aerogel blanket including a substrate for a blanket and a silica aerogel formed inside and on the surface of the substrate for a blanket, and having a cross-sectional water repellency of 0 wt % to 7 wt %.

Advantageous Effects

A silica sol according to the present invention includes a basic catalyst, an organic solvent, a hydrophobizing agent, and water in a catalyst composition, but controls the content of the basic catalyst, so that when manufacturing a silica aerogel blanket, it is possible to omit a wet aging step which is performed in the presence of a basic catalyst component and a large amount of an organic solvent, thereby increasing the amount of a solvent used, and a surface modification step which uses a large amount of an organic solvent and an expensive surface modifier, and the process of which is complex and long, thereby inhibiting economic feasibility and productivity, so that there is an effect of simplifying the process.

In the present invention, a wet aging step performed at high temperatures and a surface modification step are omitted so that energy expenditure can be reduced, and due to the omission of the above steps, aging solution supply equipment and surface modifier supply equipment are not required so that simplified manufacturing facilities can be used.

In addition, in the method for manufacturing a silica aerogel blanket according to the present invention, wet aging performed in the presence of a base catalyst solution is not performed but dry aging can be performed in a step of leaving the silica sol-substrate for a blanket composite to stand for a period of time without a solvent, so that there is an effect of reducing the amount of solvent used, and since it is possible to significantly reduce the amount of ammonium generated when the surface of a silica aerogel blanket is modified by ammonia and a surface modifier remaining after they are used during an aging step, the generation of an ammonium carbonate salt which is generated during supercritical drying can be significantly suppressed.

In addition, since the amount of ammonia in waste liquid can be greatly reduced, the waste liquid can be efficiently reused, and as the reuse rate of the waste liquid is improved, the amount of a solvent and a hydrophobizing agent lost can be reduced.

In addition, the present invention can adjust the amount of a base catalyst in a catalyst composition, thereby easily adjusting gelation time, and since the degree of hydrophobicity inside a manufactured silica aerogel blanket is excellent, there is an effect in that the cross-sectional water repellency of the blanket is excellent.

DETAILED DESCRIPTION

Hereinafter, the present invention will be described in detail with reference to the drawings. It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor can properly define the meaning of the words or terms to best explain the invention.

A silica aerogel blanket which is widely used as a thermal insulation material in construction or industrial fields has a disadvantage in that when the surface thereof is not hydrophobicized, water in the air is absorbed due to the hydrophilic properties of a silanol group (Si—OH) on the surface of silica, so that the thermal conductivity is gradually increased. Also, there is a problem in that it is difficult to manufacture a super-thermal insulation product having a meso pore since it is difficult to expect a spring back phenomenon due to the intensified pore collapse in a drying process.

Therefore, in order to maintain a low thermal conductivity by suppressing the absorption of moisture in the air, a step of modifying the surface of the silica aerogel to be hydrophobic is essentially required.

However, the surface modification step of modifying the surface of a silica aerogel to be hydrophobic uses a large amount of an organic solvent and an expensive hydrophobizing agent, and recovery and separation processes of by-products generated in the surface modification step are essential, so that a manufacturing process of an aerogel becomes complex and uneconomical in terms of time and cost, which inhibits the commercialization of a silica aerogel blanket.

Therefore, the present invention provides a silica sol, a silica aerogel blanket manufactured using the same, and a method for manufacturing the silica aerogel blanket in which an aging step and a surface modification step are omitted when manufacturing a silica aerogel blanket in order to reduce process time and cost, reduce the generation of a salt causing a problem in a drying device during supercritical drying, and increase productivity by efficiently reusing waste liquid.

1. Silica Sol

A silica sol according to an embodiment of the present invention includes a silica precursor composition and a catalyst composition, wherein the catalyst composition is characterized by including a hydrophobizing agent, a base catalyst, water, and an organic solvent, wherein the base catalyst is included in an amount of 0.4 parts by weight to 1.0 part by weight based on 100 parts by weight of the silica sol. Here, the silica sol can be a precursor which can eventually prepare a silica aerogel through a gelation reaction, or can be prepared by mixing a silica precursor composition and a catalyst composition.

Hereinafter, a silica precursor composition and a catalyst composition will be separately described.

Silica Precursor Composition

A silica precursor composition according to an embodiment of the present invention can include a silica precursor, an organic solvent, and water.

At this time, the silica precursor included in the silica precursor composition is a material for allowing a prepared aerogel to contain silica. As an example, one or more selected from the group consisting of tetra methyl ortho silicate (TMOS), tetra ethyl ortho silicate (TEOS), methyl triethyl ortho silicate, dimethyl diethyl ortho silicate, tetra propyl ortho silicate, tetra isopropyl ortho silicate, tetra butyl ortho silicate, tetra secondary-butyl ortho silicate, tetra tertiary-butyl ortho silicate, tetra hexyl ortho silicate, tetra cyclohexyl ortho silicate, and tetra dodecyl ortho silicate can be used, or a prehydrolysate of thereof can be used. When a prehydrolysate is used, the addition of an acid is not required, a process of hydrolyzing a silica precursor can be shortened or omitted, and an effect of surface modification can be promoted.

More specifically, in the present invention, as the silica precursor (HTEOS), a prehydrolyzed polyethyl silicate can be used.

Here, the HTEOS is a prehydrolyzed ethyl polysilicate oligomer material having a wide molecular weight distribution, and when synthesized into an oligomer form from a TEOS monomer the degree of prehydrolysis (the degree of hydration), physical properties such as gelation time can be adjusted, and thus, can be easily applied according to user's reaction conditions. In addition, there is an advantage in that reproducible physical properties of a final product can be created.

The silica precursor can be used in an amount such that the content of silica contained in the silica sol is 0.1 wt % to 30 wt %, but the amount of the silica precursor to be used is not limited thereto. When the content of silica satisfies the above range, it is preferable in terms of obtaining mechanical physical properties of an aerogel blanket, the flexibility thereof in particular, to an excellent level and also having an improved thermal insulation effect.

The organic solvent can specifically be an alcohol, and at this time, the alcohol can be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof can be used. Among the above, when considering the miscibility with water and an aerogel, the alcohol can be a monohydric alcohol having 1-6 carbon atoms such as methanol, ethanol, isopropanol, and butanol, and can be, for example, ethanol.

The alcohol (an organic solvent) as described above and water can be used in an appropriate amount by those skilled in the art in consideration of the degree of hydrophobicity in an aerogel to be finally prepared while promoting a surface modification reaction.

Catalyst Composition

The catalyst composition according to an embodiment of the present invention is characterized by including a hydrophobizing agent, a base catalyst, water, and an organic solvent, wherein the base catalyst is included in an amount of 0.4 parts by weight to 1.0 part by weight based on 100 parts by weight of the silica sol.

The catalyst composition of the present invention includes water together with a hydrophobizing agent in the composition, and thus, can activate the hydrophobizing agent included in the catalyst composition, and as the hydrophobizing agent is activated, aging and surface modification can be performed without using an aging solution and a surface modification solution, separately. Here, the activation of a hydrophobizing agent means that a functional group of the hydrophobizing agent other than an alkyl group, such as an alkoxy group, a halogen group, and the like are subjected to a hydrolysis reaction, thereby forming a hydroxyl group (—OH) at the position of the functional group. When the hydrophobizing agent is activated, reactivity with an —Si—O— functional group forming a network structure in a silica wet gel can be greatly increased, so that the hydrophobizing agent and the silica wet gel can react with each other without a separate additional catalyst and a solvent to achieve structure enhancement or surface modification.

When the catalyst composition includes a hydrophobizing agent but not water, the hydrophobizing agent cannot be activated. Therefore, in order to achieve aging and surface modification afterwards, aging and surface modification processes which require a large amount of solvent shroud be performed under high temperature conditions as in a typical method, and there can be a problem in which a surface modification reaction does not occur when performing drying aging. Accordingly, structure enhancement is not achieved, so that shrinkage of a gel structure can occur during drying, and since there is no surface modification reaction, there can be a problem in that a hydrophobic silica aerogel blanket is not manufactured.

When a hydrophobizing agent is included not in a catalyst composition but in a silica precursor composition, gelation time can vary according to elapsed time after the preparation of a silica precursor, so that it can be difficult to apply the same to a process of continuously manufacturing an aerogel blanket. For example, when manufacturing a silica aerogel blanket in a roll form using a roll-to-roll technique, raw materials can be stored in a state in which a silica precursor composition and a catalyst composition are each stored in a storage tank, and the compositions can be sprayed on a substrate for a blanket on a conveyor belt while moving the conveyor belt to perform gelation. At this time, when gelation time varies according to the retention time of the silica precursor composition in the storage tank, there can be a problem in that gelation is not achieved in a wet gel blanket, partially. There can be a portion which is not gelled even when the conveyor belt for gelation is all moved and a wet gel blanket starts to be wound into a roll form, so that it can be difficult to manufacture a normal aerogel blanket. In addition, the manufactured wet gel blanket is not surface-modified dry aging is performed, any thus, can shrink during drying, and a hydrophobic aerogel blanket may not be formed.

According to an embodiment of the present invention, an alkyl silane compound can be used as a hydrophobizing agent, in which case the hydrophobizing agent can participate in a gelation reaction as a co-precursor, and can hydrophobize a formed silica wet gel blanket. Since an alkyl silane compound can be gelled with a silica precursor in a gelation step, or an alkyl silane compound trapped in a gel can be subjected to aging or surface modification in a step of leaving the silica sol-substrate for a blanket composite to stand for period of time and form an alkyl-Si—O—Si network to hydrophobize a silica wet gel blanket, a surface modification step can be omitted when manufacturing a hydrophobic silica aerogel blanket. As a result, the amount of an organic solvent and a surface modifier to be used in a surface modification step can be reduced, and process time and manufacturing cost can be reduced. In addition, the amount of ammonia generated when the surface of a silica wet gel is surface-modified can be greatly reduced, so that the reuse efficiency of waste liquid generated after manufacturing the silica aerogel blanket can be increased, and when reusing the waste liquid, a hydrophobizing agent component included in the waste liquid can be included in a silica sol again, so that the amount of a hydrophobizing agent to be used can also be greatly reduced by the reuse.

Here, a hydrophobizing agent can specifically be an alkyl silane compound as described above, and as long as it is an alkyl silane compound containing an alkyl group inducing hydrophobization and a silane functional group capable of reacting with an —Si—O-functional group of a wet gel, the type thereof is not limited. More specifically, the hydrophobizing agent can include one more selected from the group consisting of trimethylethoxysilane (TMES), trimethylsilanol (TMS), trimethylchlorosilane (TMCS), methyltrimethoxysilane (MTMS), methyltriethoxysilane (MTES), dimethyldiethoxysilane (DMDEOS), ethyltriethoxysilane, and phenyltriethoxysilane.

In addition, according to an embodiment of the present invention, it can be more preferable that the hydrophobizing agent does not contain a silazane-based compound such as hexamethyldisilazane. When a silazane-based compound is included, the silazane-based compound can start to decompose when it comes into contact with an organic solvent and generate ammonia, so that as soon as the silazane-based compound is introduced into a catalyst composition including an organic solvent, a high pH can be formed due to the generation of ammonia, which can immediately start a gelation reaction. Therefore, in terms of preventing an unexpected gelation reaction and easily controlling gelation time by varying a catalyst amount, it is preferable not to include a silazane-based compound.

In addition, the hydrophobizing agent can be included in an amount of 3 to 15 parts by weight, specifically 5 to 10 parts by weight, and more specifically 6 to 8 parts by weight based on 100 parts by weight of a silica sol. When in the above range, hydrophobization efficiency (surface modification efficiency) compared to the amount used can be further improved.

In addition, the catalyst composition according to an embodiment of the present invention can include 1 equivalent to 12 equivalents of water based on 1 equivalent of a hydrophobizing agent.

Specifically, the water can be included in an amount of 1 equivalent to 12 equivalents, 2 equivalents to 10 equivalents, 3 equivalents to 8 equivalents, 4 equivalents to 8 equivalents, and more preferably 5 equivalents to 6 equivalents based on 1 equivalent of a hydrophobizing agent.

When the water is included in an amount of 3 equivalents or more based on 1 equivalent of a hydrophobizing agent, the hydrophobizing agent can be sufficiently activated, so that the structure enhancement and surface modification of a wet gel can be easily achieved without an additional catalyst, a surface modifier, and a solvent. Accordingly, it is preferable since even when wet aging and a separate surface modification process which require high-temperature temperature conditions and a large amount of an organic solvent and a surface modifier are not performed, a silica aerogel blanket having excellent hydrophobicity can be manufactured. In addition, when the water is included in an amount of 8 equivalents or less based on 1 equivalent of a hydrophobizing agent, the amount of water in a wet gel blanket can be controlled. Accordingly, water is effectively removed in a supercritical drying process to suppress the shrinkage of an aerogel due to the water, so that thermal conductivity and hydrophobicity can be further improved.

In addition, the base catalyst can be included in an amount of 0.4 parts by weight to 1.0 part by weight, specifically 0.6 parts by weight to 1.0 parts by weight, and more specifically 0.6 parts by weight to 0.8 parts by weight based on 100 parts by weight of the entire silica sol. When a base catalyst is included in an amount of less than 0.4 parts by weight, in the process of leaving in Step 3), the reactivity between a hydrophobizing agent and the surface of a silica gel is weak, which can cause a problem in that surface modification is not achieved. When included in an amount of greater than 1.0 part by weight, there can be problems in that a gelation rate is too high, so that it can be difficult to prepare a uniform gel, and also, physical properties can be degraded due to the formation of the non-uniform gel.

The base catalyst according to an embodiment of the present invention can be used without limitation as long as it is a material which can allow the formation of a pH condition for achieving gelation. For example, the basic catalyst can be an inorganic base such as sodium hydroxide and potassium hydroxide, or an organic base such as ammonium hydroxide.

Specifically, the organic base can be ammonium hydroxide ($NH_4OH$), tetramethylammonium hydroxide (TMAH), tetraethyl ammonium hydroxide (TEAH), tetrapropyl-ammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy) ethanol, 1-amino-2-propanol, triethanolamine, monopropanolamine, or dibutanol, and a mixture of two or more thereof can be used. More specifically, the base catalyst can be ammonium hydroxide (ammonia water; $NH_4OH$).

In addition, the organic solvent according to an embodiment of the present invention is the same as described above, and the amount of the organic solvent to be used can be appropriately adjusted in consideration of compatibility with water and a wet gel, and ease of structure enhancement and surface modification.

In addition, the catalyst composition can be included in an amount which allows the pH of a silica sol to be 4 to 8. When included in an amount which allows the pH of a silica sol to satisfy the above range, gelation can be easily and efficiently achieved. In addition, the catalyst composition is added in a liquid phase in which a base catalyst is diluted in water and an organic solvent, so that it is possible to prevent the problem in that the catalyst is precipitated.

2. Method for Manufacturing Silica Aerogel Blanket

Specifically, a method for manufacturing a hydrophobic silica aerogel according to an embodiment of the present invention includes 1) preparing a silica sol, 2) impregnating the silica sol into a substrate for a blanket, and 3) leaving the silica sol-substrate for a blanket composite to stand for a period of time, wherein the silica sol is the above-described silica sol.

Hereinafter, the method for manufacturing a hydrophobic silica aerogel of the present invention will be described in detail, step by step.

Step 1)

Step 1) according to an embodiment of the present invention is a step for preparing a silica sol, and can be performed by mixing a silica precursor composition and a catalyst composition. At this time, the silica sol, the silica precursor composition, and the catalyst composition are all the same as described above.

In addition, the mixing of a silica precursor composition and a catalyst composition can be performed under the conditions of room temperature and atmospheric pressure.

In the present invention, since the above-described silica sol is prepared in Step 1), even when a silica sol-substrate for a blanket composite are left to stand without an additional base catalyst, a surface modifier, and an organic solvent in Step 3), structure enhancement and surface modification can be achieved.

Step 2)

Step 2) according to an embodiment of the present invention is a step for forming a silica sol-substrate for a blanket composite, and can be performed by impregnating the silica sol of Step 1) into a substrate for a blanket.

The term "impregnation" used herein can be achieved by introducing a sol having fluidity to a substrate for a blanket, and can indicate that the sol is penetrated into pores inside the substrate for a blanket.

The substrate for a blanket according to an embodiment of the present invention can specifically be a porous substrate in terms of improving the thermal insulation properties of a silica aerogel blanket. When a porous substrate for a blanket is used, a silica sol is allowed to easily penetrate into the substrate, and thus, forms an aerogel uniformly inside the substrate for a blanket, so that a silica aerogel blanket manufactured can have excellent thermal insulation properties.

According to an embodiment of the present invention, the substrate for a blanket can be a film, a sheet, a net, a fiber, a porous body, a foam, a non-woven body, or a laminate of two or more layers thereof. Also, according to the use of the substrate for a blanket, surface roughness can be formed or patterned on the surface thereof. Specifically, the substrate for a blanket can be a fiber capable of further improving thermal insulation performance by including a space or a void which allows an aerogel to be easily formed inside the blanket substrate, and can have low thermal conductivity.

Specifically, the substrate for a blanket can be polyamide, polybenzimidazole, polyaramid, an acryl resin, a phenol resin, polyester, polyetheretherketone (PEEK), polyolefin (polyethylene, polypropylene, or a copolymer thereof, and the like), cellulose, carbon, cotton, wool, hemp, a non-woven fabric, a glass fiber, or ceramic wool, and the like.

Step 3)

Step 3) according to an embodiment of the present invention is a step for leaving the silica sol-substrate for a blanket composite to stand for a period of time, and gelation, aging, and surface modification can be performed in Step 3).

In addition, the present invention is characterized in that since the silica sol of Step 1) described above is used, aging and surface modification can be easily achieved after gelation without using a separate surface modification solution and an aging solution (a base catalyst and a solvent).

Since wet aging, and a surface modification process using a separate surface modification solution are not performed as described above, the amount of a solvent to be used and the amount of a surface modifier to be used can be greatly reduced compared to a typical silica aerogel blanket manufacturing process. In addition, since a base catalyst component included in the wet aging and the generation amount of ammonia generated from a surface modification reaction can be significantly lowered, the amount of ammonia in waste liquid generated after manufacturing an aerogel blanket is reduced, so that the reuse efficiency of the waste liquid can be increased.

According to an embodiment of the present invention, Step 3) can be performed at room temperature or under the condition of temperatures exceeding room temperature. Here, the room temperature can refer to a temperature of 15° C. to 30° C., 15° C. to 25° C., or 20° C. to 25° C. In addition, the temperatures exceeding room temperature can mean a condition of high temperatures which exceed the room temperature and under which the gelation, aging, and surface modification of a silica sol-substrate for a blanket composite can be performed, and can specifically mean a temperature of 30° C. to 100° C., 40° C. to 80° C., or 50° C. to 70° C.

In addition, when Step 3) is performed at room temperature, Step 3) can be performed for 5 hours to 48 hours, preferably 10 hours to 38 hours, and more preferably 15 hours to 24 hours. When Step 3) is performed under the condition of temperatures exceeding room temperature, Step 3) can be performed for 1 hour to 24 hours, preferably 2 hours to 15 hours, and more preferably 3 hours to 10 hours.

That is, Step 3) can be performed at room temperature or under the condition of temperatures exceeding room temperature, at which the gelation, aging, and surface modification of the silica sol-substrate for a blanket composite can be performed, and performance time can be adjusted according to the temperature conditions. As a specific example, when performing Step 3) on the same silica sol-substrate for a blanket composite, the temperature conditions can be selected between the condition of room temperature or the condition of temperatures exceeding room temperature. At this time, when performing Step 3) under the condition of room temperature, it can take longer than performing the same under the temperature conditions exceeding room temperature. However, heat energy for maintaining a temperature exceeding room temperature is not required, so that energy cost can be saved. In addition, when performing Step 3) under the condition of temperatures exceeding room temperature, heat energy can be consumed to maintain a temperature exceeding room temperature compared to performing the same under the room temperature. However, the performance time of Step 3) can be shortened. Therefore, the temperature condition for Step 3) can be selected appropriately as needed, and in terms of saving heat energy for maintaining temperatures exceeding room temperature, it is preferable the Step 3) is performed under the condition of room temperature.

In addition, the manufacturing method of the present invention can adjust the amount of a base catalyst in a catalyst composition, thereby easily adjusting gelation time to manufacture a silica aerogel having intended physical properties. At this time, gelation time can preferably be adjusted to 1 to 25 minutes, specifically 5 minutes to 10 minutes.

In the present invention, gelation can form a network structure from a precursor material, wherein the network structure can be a planar mesh structure in which specific polygons having one or more types of atomic arrangement are linked to each other, or a structure in which specific polyhedrons share their vertices, edges, faces, and the like with each other to form a three-dimensional skeleton structure.

In addition, according to an embodiment of the present invention, a drying step can be further included after Step 3), wherein a silica wet gel blanket is dried to prepare a hydrophobic silica aerogel.

Meanwhile, the manufacturing method according to an embodiment of the present invention can further perform a washing step before the drying. The washing is a step for removing impurities (sodium ions, unreacted substances, by-products, and the like) generated during the reaction and residual ammonia, which can generate an ammonium carbonate salt by reacting with $CO_2$ during supercritical drying, and the like in order to obtain a hydrophobic silica aerogel with high purity, and can be performed by a dilution process or an exchange process using a non-polar organic solvent.

The drying step according to an embodiment of the present invention can be performed through a process for removing a solvent while maintaining the pore structure of an aged silica gel, and the drying step can be performed by supercritical drying.

The supercritical drying process can be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide comes to be in a critical state in which gas and liquid cannot be distinguished. Carbon dioxide in a critical state is referred to a supercritical carbon dioxide.

A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time can be shortened.

Specifically, the supercritical drying process performs a solvent substitution process in which an aged silica gel is placed into a supercritical drying reactor, $CO_2$ in a liquid state is filled therein, and an alcohol solvent inside a silica aerogel is substituted with $CO_2$. Thereafter, the temperature is raised to 40° C. to 80° C. at a predetermined temperature raising rate, specifically, 0.1° C./min to 1° C./min, and the pressure which is greater than a pressure at which carbon dioxide comes to be a supercritical state, specifically, the pressure of 100 bar to 170 bar is maintained to allow the carbon dioxide to remain in the supercritical state for a predetermined amount of time, specifically for 20 minutes to 1 hour. In general, carbon dioxide comes to be in a supercritical state at a temperature of 31° C. and pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

As a result of the above drying process, a blanket including a porous silica aerogel having nano-sized pores and/or a blanket including a porous silica aerogel can be manufactured. The silica aerogel has excellent physical properties, low tap density and high porosity in particular, together with a high degree of hydrophobicity, and a silica aerogel-containing blanket including the same has excellent mechanical flexibility together with low thermal conductivity.

In addition, before or after the drying process, a compression process to control the thickness and to make the internal structure and surface shape of a blanket uniform, a molding process to have a suitable shape or morphology according to use, or a lamination process for laminating a separate functional layer can be further performed.

3. Silica Aerogel Blanket

The present invention provides an aerogel blanket having uniform thermal conductivity and greatly improved overall thermal insulation due to the uniform thermal conductivity formed in the blanket. According to an embodiment of the present invention, the present invention provides a silica aerogel blanket including a substrate for a blanket and a silica aerogel formed inside and on the surface of the substrate for a blanket, and having a cross-sectional water repellency of 0.0 wt % to 7.0 wt %, thereby having excellent hydrophobicity in the blanket. Specifically, the silica aerogel blanket can have a large amount of aerogel particles evenly formed inside and on the surface of the blanket.

In addition, the cross-sectional water repellency can specifically be 2.5 wt % or less, or 2.0 wt % or less, 0.0 wt % or greater, or 0.1 wt % or greater. When the cross-sectional water repellency has a low value, it means that a silica aerogel is uniformly formed inside the substrate for a blanket, and when the cross-sectional water repellency is 0 wt %, it means that moisture is not penetrated at all into the cross-section of a silica aerogel blanket.

In addition, the silica aerogel blanket can be manufactured by the method for manufacturing a silica aerogel blanket described above.

In addition, the thickness of the silica aerogel blanket can be appropriated selected according to the use thereof by adjusting the thickness of a substrate for a blanket. When considering the ease of handling and storage of a silica aerogel blanket in the form of a roll, the thickness thereof can specifically be 20 mm or less, more specifically 0.1 to 20 mm.

Here, the cross-sectional water repellency can be water repellency measured after cutting a manufactured silica aerogel blanket having a thickness of 10 mm in the thickness direction thereof, and can specifically be water repellency measured after cutting a silica aerogel blanket having a size of 10 mm×100 mm×10 mm in the thickness direction thereof. In addition, the water repellency can be measured by the measurement method below. The specimen is floated on distilled water of 21±2° C., and a mesh screen on the specimen is sunk to 127 mm below the surface of the water. 15 minutes later, the screen is removed, and when the specimen rises to the surface, the specimen is picked up with a clamp and is hung vertically for 60±5 seconds. Thereafter, the weight before and after the impregnation are each measured to confirm a weight increase rate, and the weight increase rate can be represented as water repellency.

Accordingly, the aerogel blanket of the present invention can be usefully used as a thermal insulation material, a lagging material, or a non-combustible material for aircrafts, ships, automobiles, building structures, and the like, as well as for plant facilities for insulating and cooling, such as piping and industrial furnaces of various industrial facilities.

Hereinafter, Examples and the like will be described in detail to facilitate understanding of the present invention. However, Examples according to the present invention can be modified into other various forms, and the scope of the present invention should not be construed as being limited to Examples described below. Examples of the present invention are provided to more fully describe the present invention to those having ordinary skill in the art to which the present invention belongs.

EXAMPLES

Example 1

31.90 g of a pre-hydrolyzed TEOS (silica content=20 wt %, HTEOS), 31.35 g of ethanol, and 2.8 g of water were added to a reactor and mixed to prepare a silica precursor composition. In addition, 7.77 g of trimethylethoxysilane (TMES) as a hydrophobizing agent, 47.28 g of ethanol, 4.22 g of water, and as a base catalyst, 2.75 g of ammonia water (concentration: 30 wt %) were added to another reactor and mixed to prepare a catalyst composition. In the prepared catalyst composition, the total amount of the water was 5.12 equivalents based on 1 equivalent of TMES, and the amount of the base catalyst was 0.64 parts by weight based on 100 parts by weight of the entire sol. The silica precursor composition and the catalyst composition prepared were mixed to prepare a silica sol, and the silica sol was impregnated into a fiber (a glass-fiber mat, 10 mm thick) which is a substrate for a blanket. A fiber composite impregnated with the silica sol was left to stand at room temperature for 24 hours to be subjected to gelation, surface modification, and aging. A silica wet gel blanket manufactured was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, ethanol was recovered through a lower end of the extractor. Thereafter, $CO_2$ was vented over the course of 2 hours. After supercritical drying was completed, drying was performed for 1 hour under the conditions of 150° C. and atmospheric pressure to manufacture a silica aerogel blanket.

Example 2

A silica aerogel blanket was manufactured in the same manner as in Example 1 except that a catalyst composition was blended to allow the total amount of water in the catalyst composition to be 3 equivalents based on 1 equivalent of TMES in Example 1. When blending the catalyst composition, the content of ethanol was also adjusted to allow the total content of the catalyst composition to be the same, and a base catalyst was 0.64 parts by weight based on 100 parts by weight of the entire sol.

Example 3

A silica aerogel blanket was manufactured in the same manner as in Example 1 except that a catalyst composition was blended to allow a base catalyst to be 0.48 parts by weight based on 100 parts by weight of the entire sol by adjusting the addition amount of ammonia water (concentration: 30 wt %) in Example 1.

Example 4

A silica aerogel blanket was manufactured in the same manner as in Example 1 except that a catalyst composition was blended to allow the total amount of water in the catalyst composition to be 2.0 equivalents based on 1 equivalent of TMES in Example 1. When blending the catalyst composition, the content of ethanol was also adjusted to allow the total content of the catalyst composition to be the same, and a base catalyst was 0.64 parts by weight based on 100 parts by weight of the entire sol.

Example 5

A silica aerogel blanket was manufactured in the same manner as in Example 1 except that a catalyst composition was blended to allow the total amount of water in the catalyst composition to be 10.0 equivalents based on 1 equivalent of TMES in Example 1. When blending the catalyst composition, the content of ethanol was also adjusted to allow the total content of the catalyst composition to be the same, and a base catalyst was 0.64 parts by weight based on 100 parts by weight of the entire sol.

Comparative Example 1

31.90 g of a pre-hydrolyzed TEOS (HTEOS), 7.77 g of TMES as a hydrophobizing agent, 47.28 g of ethanol, and 2.8 g of water were added to a reactor and mixed to prepare a silica precursor composition. In addition, 47.28 g of ethanol, 4.22 g of water, and 2.75 g of ammonia water (concentration: 30 wt %) were added to another reactor and mixed to prepare a catalyst composition. A silica aerogel blanket was manufactured in the same manner as in Example 1 except that the silica precursor and the catalyst composition prepared above were used.

Comparative Example 2

1.30 mol of ethanol and 0.02 g of a HCl acid catalyst were added to a reactor and mixed, and then 0.62 mol of hexamethyldisilazane (HMDS) was added thereto and mixed. Thereafter, the mixture was subject to reflux at 100° C. for 1 hour, and the generation of ammonia ($NH_3$) gas was confirmed. 1 hour after the reflux, the reaction solution (a catalyst composition) was collected, and then added to a pre-hydrolyzed TEOS (HTEOS) ethanol solution (silica content=20 wt %) and mixed to prepare a silica sol. The reaction solution was a solution composed of HMDS, TMES which is a reaction product of the ethanol and the acid catalyst, a gaseous ammonia ($NH_3$), and ethanol. A silica wet gel blanket was manufactured in the same manner as in Example 1 except that the silica sol prepared above was used.

Comparative Example 3

A silica aerogel blanket was manufactured in the same manner as in Example 1 except that a catalyst composition was blended to allow a base catalyst to be 0.26 parts by weight based on 100 parts by weight of the entire sol by adjusting the addition amount of ammonia water (concentration: 30 wt %) in Example 1.

Comparative Example 4

The same was performed as in Example 1 except that a catalyst composition was blended to allow a base catalyst to be 1.1 parts by weight based on 100 parts by weight of the entire sol by adjusting the addition amount of ammonia water (concentration: 30 wt %) in Example 1. However, when preparing a silica sol by mixing the silica precursor composition and the catalyst composition, a gelation rate was too high, so that even before the silica precursor composition and the catalyst composition were uniformly mixed, gelation already proceeded, so that a non-uniform gel was formed, which made it impossible to prepare a silica sol. Accordingly, it was not possible to impregnate a silica sol into a substrate for a blanket, so that not only a fiber composite impregnated with a silica sol, but also a silica aerogel blanket were not manufactured.

Reference Example 1

31.90 g of a pre-hydrolyzed TEOS (HTEOS), 24.41 g of ethanol, and 11.12 g of water were added to a reactor and mixed to prepare a silica precursor composition. In addition, 60.54 g of ethanol and 0.69 g of ammonia water (concentration: 30 wt %) were added to another reactor and mixed to prepare a catalyst composition. The prepared silica precursor and the catalyst composition were mixed to prepare a silica sol, and the silica sol was impregnated into a fiber (a glass-fiber mat, 10 mm thick) which is a substrate for a blanket. Gelation was induced for 10 minutes to manufacture a silica wet gel blanket. The manufactured silica wet gel blanket was aged at a temperature of 50° C. for 1 hour using an ammonia ($NH_3$)/ethanol solution (2.2:97.8 volume ratio). The aged silica wet gel blanket was added with 90 wt % of a hexamethyldisilazane (HMDS)/ethanol solution (5:95 volume ratio) based on the volume of the wet gel blanket, and then was subjected to surface modification at a temperature of 70° C. for 4 hours. Thereafter, a silica aerogel blanket was manufactured by performing supercritical drying and atmospheric drying under the same condition as in Example 1.

Experimental Example 1: Measurement of Gelation Time

The time taken for a gelation reaction according to elapsed time of the silica precursor composition in each of Examples 1 to 5, Comparative Example 1 to 3, and Reference Example 1 was measured, and the results are shown in Table 1. Specifically, in each of Examples, Comparative Examples, and Reference Examples, the silica precursor composition was added with a catalyst composition when 0.5 hours, 1 hour, and 2 hours was elapsed after the silica precursor composition was prepared to measure gelation time, and the difference in gelation time according to the elapsed time after the preparation of the silica precursor composition is shown in Table 1 below.

TABLE 1

| | Gelation time (min) | | |
| --- | --- | --- | --- |
| | Duration 0.5 H | Duration 1 H | Duration 2 H |
| Example 1 | 4 | 4 | 4 |
| Example 2 | 5 | 5 | 5 |
| Example 3 | 6 | 6 | 6 |
| Example 4 | 5 | 5 | 5 |
| Example 5 | 3 | 3 | 3 |

TABLE 1-continued

| | Gelation time (min) | | |
| --- | --- | --- | --- |
| | Duration 0.5 H | Duration 1 H | Duration 2 H |
| Comparative Example 1 | 15 | 18 | 25 |
| Comparative Example 2 | 10 | 10 | 10 |
| Comparative Example 3 | 10 | 10 | 10 |
| Comparative Example 4 | Measurement not possible | Measurement not possible | Measurement not possible |
| Reference Example 1 | 10 | 10 | 10 |

As shown in Table 1 above, it can be confirmed that Examples 1 to 5 maintained constant gelation time without being affected by the retention time of the silica precursor. The maintaining of constant gelation time can act as a factor for facilitating the process control when manufacturing an aerogel blanket. However, as for Comparative Example 1 in which a hydrophobizing agent was included in the silica precursor composition, it can be confirmed that as retention time (elapsed time) after the preparation of the silica precursor composition was changed, gelation time was also changed, and in this case, it can be difficult to apply the same to a process of continuously manufacturing an aerogel blanket.

For example, when manufacturing a silica aerogel blanket in a roll form using a roll-to-roll technique, a silica precursor composition and a catalyst composition can each be stored in a storage tank, and then each composition can be sprayed on a substrate for a blanket on a conveyor belt while moving the conveyor belt to perform gelation. At this time, when gelation time varies according to the retention time of the silica precursor composition in the storage tank, there can be a problem in that gelation is not achieved in a wet gel blanket, partially.

In addition, in the case of Comparative Example 4, a gelation rate was too high, so that even before the silica precursor and the catalyst composition were uniformly mixed, gelation already proceeded, and thus, a non-uniform gel was formed, which made it impossible to measure gelation time.

Experimental Example 2: Measurement of Physical Properties of Aerogel Blanket 1) Thermal Conductivity The room temperature (about 23±3° C.) thermal conductivity of the silica aerogel blanket manufactured in each of Examples and Comparative Examples was measured using the HFM 436 equipment of NETZSCH Co., Ltd, and the results are shown in Table 2.

2) Measurement of Water Repellency (Wt %)

The surface water repellency and cross-sectional water repellency of the silica aerogel blanket manufactured in each of Examples and Comparative Examples were measured.

Specifically, a specimen having a size of 100 mm×100 mm was floated on distilled water of 21±2° C., and a mesh screen on the specimen was sunk to 127 mm below the surface of the water. 15 minutes later, the screen was removed, and when the specimen rose to the surface, the specimen was picked up with a clamp and was hung vertically for 60±5 seconds. Thereafter, the weight before and after the impregnation were each measured to determine a weight increase rate, and the weight increase rate was represented as surface water repellency. The lower the surface water repellency, the better the degree of hydrophobicity of the surface of the silica aerogel blanket.

Meanwhile, the cross-sectional water repellency was measured in the same manner as the surface water repellency by cutting the specimen (thickness: 10 mm) having a size 100 mm×100 mm to a size of 10 mm×100 mm. The lower the cross-sectional water repellency, the better the degree of hydrophobicity inside the silica aerogel blanket.

TABLE 2

| | Thermal conductivity (mW/m · K) | Surface water repellency (wt %) | Cross-sectional water repellency (wt %) |
|---|---|---|---|
| Example 1 | 17.2 | 2.18 | 0.71 |
| Example 2 | 17.2 | 2.39 | 1.63 |
| Example 3 | 18.1 | 3.25 | 2.19 |
| Example 4 | 18.1 | 6.85 | 6.94 |
| Example 5 | 19.3 | 3.54 | 3.77 |
| Comparative Example 1 | 18.6 | 10 or greater | 10 or greater |
| Comparative Example 2 | 18.3 | 10 or greater | 10 or greater |
| Comparative Example 3 | 17.8 | 10 or greater | 10 or greater |
| Comparative Example 4 | Measurement not possible | Measurement not possible | Measurement not possible |
| Reference Example 1 | 17.7 | 1.93 | 2.68 |

As shown in Table 2 above, it can be confirmed that Examples 1 to 5 exhibited improved or a similar level of thermal conductivity compared to Comparative Examples 1 to 3 and Reference Example 1 which was prepared by a typical method, from which it can be confirmed that an aerogel blanket having ensured thermal insulation performance can be manufactured in Examples 1 to 5.

In addition, it can be confirmed that Examples 1 to 5 have a significantly lower value of surface water repellency and of cross-sectional water repellency than Comparative Examples 1 to 3, and it can be confirmed that the cross-sectional water repellency of Examples 1 to 3 particularly have a significantly lower value than Reference Example 1. From excellent cross-sectional water repellency physical properties of Examples 1 to 3, it can be confirmed that an aerogel is uniformly formed not only on the surface of the blanket but also inside the blanket. In addition, Comparative Examples 2 and 3 have a surface water repellency value and a cross-sectional water repellency value of 1 wt % or greater, so that it can be confirmed no hydrophobicity was exhibited. This is because aging and surface modification did not proceed even when the step of leaving the silica sol-substrate for a blanket composite to stand for a period of time was performed under the room temperature condition, and thus, a hydrophobic aerogel blanket was not formed.

In addition, in Comparative Example 4, it was impossible to impregnate a silica sol into the substrate for a blanket, so that not only a fiber composite impregnated with a silica sol, but also a silica aerogel blanket were not manufactured. Accordingly, it was not possible to measure thermal conductivity and water repellency.

Meanwhile, in the case of Reference Example 1, wet aging at high temperatures and surface modification were each performed for a predetermined time according to a typical method without performing the step of leaving the silica sol-substrate for a blanket composite to stand for a period of time at room temperature, and a normal hydrophobic silica aerogel blanket was confirmed to be formed. However, energy expenditure due to the performance of wet aging and surface modification was greater than Examples, and due to the use of an excessive amount of solvent in the process, a large amount of solvent was lost. In addition, since separate surface modifier supply equipment, aging solution supply equipment, and the like need to be additionally included, there are problems in that not only the process is cumbersome but also manufacturing cost greatly increases.

On the other hand, in Examples 1 to 5, gelation, aging, and surface modification can all be performed by only performing the step of leaving the silica sol-substrate for a blanket composite to stand for a period of time at room temperature, so that there are advantages in that energy expenditure can be greatly reduced, the amount of solvent used can also be reduced since it is easy to reuse a solvent, and it is possible to manufacture an aerogel blanket with relatively simple equipment.

The foregoing description of the present invention has been presented for purposes of illustration. It will be understood by those skilled in the art that various changes in form and details can be made therein without departing from the spirit and scope of the invention. It is therefore to be understood that the above-described embodiments are illustrative in all aspects and not restrictive.

The invention claimed is:

1. A method for manufacturing a silica sol, the method comprising:
    1) preparing a silica precursor composition in a first container,
    2) preparing a catalyst composition comprising a hydrophobizing agent, a base catalyst, water, and an organic solvent in a second container different from the first container, and
    3) preparing the silica sol by mixing the silica precursor composition and the catalyst composition together,
    wherein the base catalyst included in the catalyst composition is in an amount of 0.4 parts by weight to 1.0 part by weight based on 100 parts by weight of the silica sol, and
    wherein the hydrophobizing agent is different from the base catalyst.

2. The method of claim 1, wherein the water is included in an amount of 3 equivalents to 8 equivalents based on 1 equivalent of the hydrophobizing agent.

3. The method of claim 1, wherein the hydrophobizing agent is included in an amount of 3 parts by weight to 15 parts by weight based on 100 parts by weight of the catalyst composition.

4. The method of claim 1, wherein the hydrophobizing agent comprises one or more selected from the group consisting of trimethylethoxysilane (TMES), trimethylsilanol (TMS), hexamethyldisiloxane (HMDSO), trimethylchlorosilane (TMCS), methyltrimethoxysilane (MTMS), methyltriethoxysilane (MTES), dimethyldiethoxysilane (DMDEOS), ethyltriethoxysilane, and phenyltriethoxysilane.

5. The method of claim 1, wherein the silica precursor in the silica precursor composition includes one or more selected from the group consisting of tetra methyl ortho silicate (TMOS), tetra ethyl ortho silicate (TEOS), methyl triethyl ortho silicate, dimethyl diethyl ortho silicate, tetra propyl ortho silicate, tetra isopropyl ortho silicate, tetra butyl ortho silicate, tetra secondary-butyl ortho silicate, tetra tertiary-butyl ortho silicate, tetra hexyl ortho silicate, tetra cyclohexyl ortho silicate, and tetra dodecyl ortho silicate, or a prehydrolysate of thereof.

6. The method of claim 1, wherein the silica precursor composition comprises a silica precursor, an organic solvent, and water.

7. A method for manufacturing a silica aerogel blanket, the method comprising:

1) preparing a silica sol;

2) impregnating the silica sol into a substrate for a blanket; and 3) leaving the silica sol-substrate for a blanket composite to stand, wherein the silica sol is manufactured by the method of claim 1.

8. The method of claim 7, wherein gelation, surface modification, and aging are performed in Step 3).

9. The method of claim 7, wherein Step 3) is performed without using a separate surface modification solution and an aging solution.

10. The method of claim 7, wherein Step 3) is performed under conditions of room temperature or temperatures exceeding room temperature.

11. The method of claim 8, wherein the time during which gelation is performed in Step 3) is 3 to 10 minutes.

12. The method of claim 7, further comprising a step of drying after Step 3).

\*　\*　\*　\*　\*